United States Patent [19]

Hamada

[11] Patent Number: 4,679,057
[45] Date of Patent: Jul. 7, 1987

[54] LASER RECORDING APPARATUS

[75] Inventor: Akiyoshi Hamada, Toyokawa, Japan

[73] Assignee: Minolta Camera Kabushiki Kaisha, Osaka, Japan

[21] Appl. No.: 799,916

[22] Filed: Nov. 20, 1985

[30] Foreign Application Priority Data

Nov. 22, 1984 [JP] Japan .................. 59-247278
Nov. 22, 1984 [JP] Japan .................. 59-247279

[51] Int. Cl.$^4$ .................. G01D 15/14; H04N 1/21
[52] U.S. Cl. .................. 346/76 L; 346/108; 346/160; 358/298
[58] Field of Search .................. 346/108, 76 L, 160; 358/298

[56]       References Cited
U.S. PATENT DOCUMENTS 4,307,408  12/1981  Kiyohara et al. .............. 346/76 L
4,473,829   9/1984  Immink et al. ................ 346/1.1 X Primary Examiner—E. A. Goldberg
Assistant Examiner—Gerald E. Preston
Attorney, Agent, or Firm—Price, Gess & Ubell

[57]                ABSTRACT

Disclosed is a tone reproducible laser recording apparatus in which a laser beam is produced by a pulse signal modulated in amplitude and also in pulse width in accordance with a multi-tone image signal and/or another factor. This apparatus, when a semiconductor laser is used as a laser light source, further includes an optical element disposed in an optical path of the beam. The optical element cuts off light in a range under a threshold wavelength to enlarge a linearity between exciting current and light outputs.

16 Claims, 15 Drawing Figures

LASER RECORDING APPARATUS

BACKGROUND OF THE INVENTION

The present invention relates to a laser recording apparatus, and more particularly to a laser recording apparatus having good tone reproducibility.

With laser recording apparatus, a record medium is raster-scanned with a laser beam which is modulated to form images on the record medium. The record medium is, for example, a photoconductive member. An electrostatic image is formed on the photoconductive member by the laser beam and then made into a copy image by a known electrophotographic process.

Various proposals have been made for reproducing tones with the use of the laser recording apparatus.

The first of these proposal is a system for subjecting the laser beam to intensity (amplitude) modulation. With this system, the intensity of the laser beam to be modulated at a constant time interval is varied in accordance with an input signal as shown in FIG. 1. Since the exposure time for each dot is definite, this system forms images with a constant resolution, whereas because the variation of the output and nonlinear modulation characteristics directly influences tone reproducibility, the system has a drawback in that it becomes increasingly difficult to obtain linear reproducibility with an increase in the number of tones.

The second proposal is a system for subjecting the laser beam to time (pulse width) modulation. This system is adapted to vary the pulse width of the laser beam to be modulated as seen in FIG. 2. Because the intensity is definite, variations of the output produce little or no influence on tone reproducibility, permitting the system to achieve substantially constant tone reproducibility. However, the exposure time which varies from dot to dot results in a drawback in that the resolution of output images tends to become unstable. Further with this system, the image recording speed is dependent on the minimum unit time which determines the pulse width, so that if it is attempted to maintain the desired recording speed while retaining high tone reproducibility, there arises a need to use a modulation frequency of the order of a gigahertz (GHz). On the other hand, a reduction in the modulation frequency entails a reduced recording speed.

According to the third proposal, the input image signal itself is processed. The systems of this type include a dot pattern system wherein each pixel is composed of a plurality of dots to reproduce tones according to the dot pattern, and a multi-level dither system wherein a simulated random number is superposed on the image signal. These systems require a period of time for processing the input signal and have the likelihood that the image quality will vary according to the tone level. The dot pattern system requires an optical system of high resolving power.

To discuss the laser source, semiconductor lasers have found wide use in recent years which have many advantages such as compactness, high efficiency, high stability and amenability to direct modulation. However, the intensity modulation system employing a semiconductor laser is unable to reproduce a very large number of tones. With reference to FIG. 3, the relationship between the exciting current of the semiconductor laser and the light output thereof changes greatly at the threshold current Ith, so that only the range between the threshold current Ith and the maximum current Imax has heretofore been used for tone reproduction. The ratio Pmax/Pth of the maximum Pmax of light output available in this range to the minimum Pth thereof is, for example, about 30 to about 50, which is about 1.5 to about 1.7 in terms of image density difference.

Additionally, the photoconductive members serving as record media vary in sensitivity from member to member and therefore exhibit different tone reproducibilities, whichever of the foregoing systems may be used. Thus, the difference between individual members must be corrected.

SUMMARY OF THE INVENTION

Accordingly, the main object of the present invention is to provide a laser recording apparatus having good tone reproducibility.

Another object of the invention is to provide a laser recording apparatus which is adapted to reproduce a large number of tones.

The above and other objects of the invention can be fulfilled by pulse-modulating input image signals in amplitude and pulse width. This affords a larger number of tones than is available only by amplitude or pulse width modulation.

Furthermore, the above and other objects can be fulfilled by the combination of an amplitude modulation system and an optical element disposed within a laser beam for blocking the light of wavelengths shorter than the laser oscillation wavelength at the threshold current, whereby the region below the threshold current and conventionally unusable can also be included in the range of amplitude modulation to provide a further increased number of tones.

BRIEF DESCRIPTION OF THE DRAWINGS

These and other objects or features of the present invention will become apparent from the following description of preferred embodiments thereof taken in conjunction with the accompanying drawings, in which.

In the following description, like parts are designated by like reference numerals throughout the several drawings.

DESCRIPTION OF THE PREFERRED EMBODIMENTS

Figure 4:
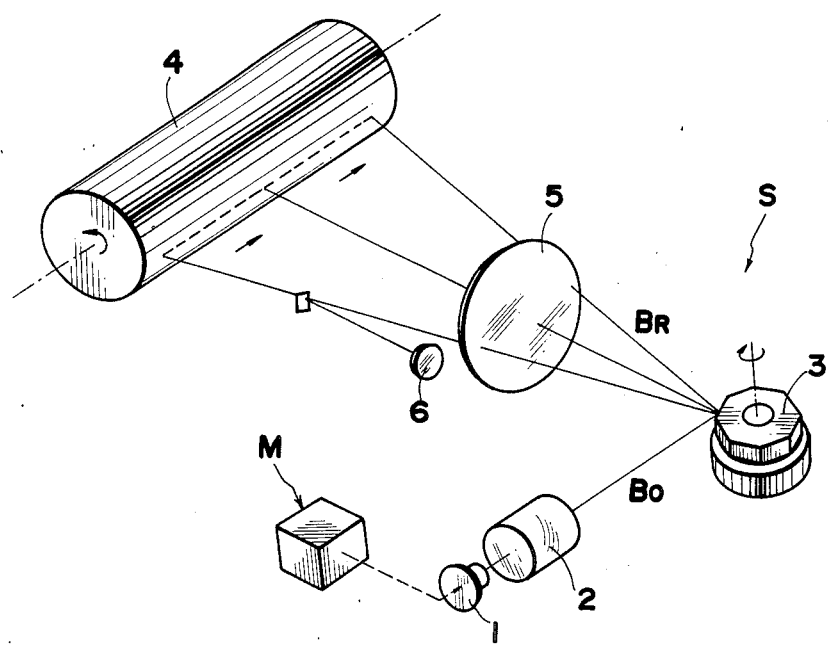
FIG. 4 is a diagram schematically showing a laser printer to which the present invention is applied.

FIG. 4 is a diagram showing the construction of a laser printer to which the present invention is applied. A semiconductor laser 1 produces a laser beam, which is shaped by a collimator lens 2 and then led to a polygonal mirror 3. The incident laser beam Bo is reflected and swept as indicated at BR by the mirror 3 which is drivingly rotated by an unillustrated motor. The beam BR moves straight on a photoconductive drum 4. Indicated at 5 is an fθ lens, and at 6 a detector for giving a start-of-scan (SOS) signal for determining the position where an image is to be formed on the drum 4. When the beam is detected by the detector 6, an operation is started to count up clock pulses of a frequency at least about 10 times the bit rate. When a predetermined count is reached, the SOS signal is emitted to start modulation of an image signal. The image signal is modulated by a modulation system M.

Figure 5:
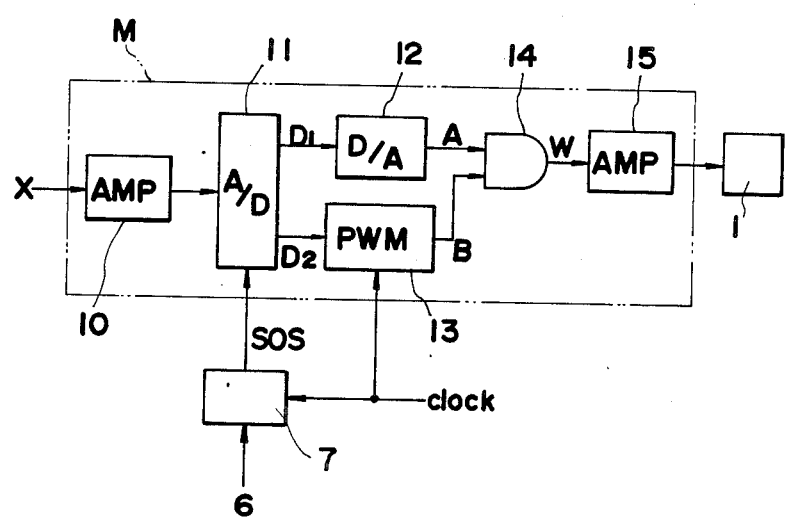
FIG. 5 is a block diagram showing the construction of a modulation system embodying the present invention.

As seen in FIG. 5, the modulation system M receives an analog image signal X, which is then modulated in amplitude and pulse width and thereafter fed to the semiconductor laser 1. The input image signal X is first amplified by an amplifier 10 and then fed to an A/D converter 11, which in turn delivers divided outputs, i.e., an upper bit signal D1 and a lower bit signal D2. The A/D converter 11 has connected thereto a counter 7 which starts counting up reference clock pulses upon the detector 6 detecting the beam. A/D conversion is commenced in response to an SOS signal from the counter 7.

The upper bit signal D1 is fed to a D/A converter 12, and the lower bit signal D2 to a pulse width modulator 13. The modulator 13 receives reference clock pulses, which are used for the modulator 13 to prepare pulses of width in accordance with the lower bit input D2. The outputs A and B of the D/A converter 12 and the modulator 13 are combined in an AND circuit 14, and the resulting output W is amplified by an amplifier 15 and then given to the semiconductor laser 1.

Figure 6A:
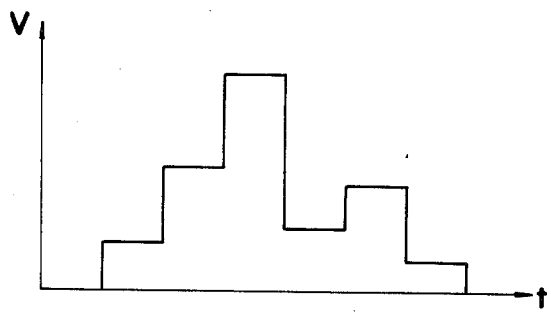
FIGS. 6 A, B and C are diagrams for illustrating the mode of modulation effected by the system of FIG. 5.
Figure 6B:
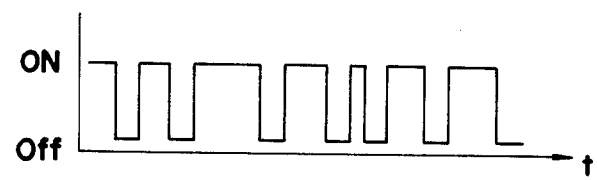
Figure 6C:
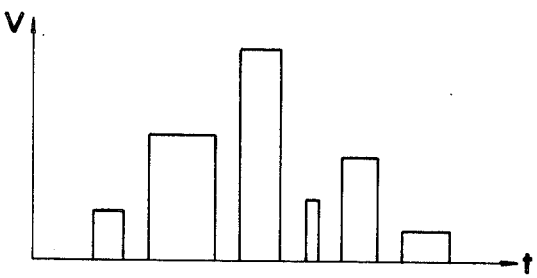

The above operation will be described more specifically. When the A/D converter 11 is designed to handle 6-bit signals, the number of tones available is 64 ($=2^6$). Of the six bits, the upper 3-bit signal portion D1 is fed to the D/A converter 12 to provide a signal A which represents the available tones as greatly divided into, eight ($=2^3$) levels (see FIG. 6A). On the other hand, the lower 3-bit signal portion D2 is fed to the pulse width modulator 13 to give a signal B which represents each divided tone level as further finely divided into eight ($=2^3$) levels (see FIG. 6B). The two signals A and B are combined together, affording a signal W which has been modulated in amplitude and width as seen in FIG. 6C.

Accordingly, the amplitude modulation and the width modulation, although providing 8 tones each, consequently afford tones which are in number the square of each number of tones, i.e., 64 tones. An attempt to give an increased number of tones only by amplitude modulation would involve an adverse effect of the variation of the output, or an attempt to obtain a larger number of tones solely by pulse width modulation would result in a reduced scan speed or require reference pulses of very high frequency, whereas the above embodiment, wherein clock pulses of a frequency about 10 times the dot rate are used, provides an increased number of tones without entailing these drawbacks.

Figure 7:
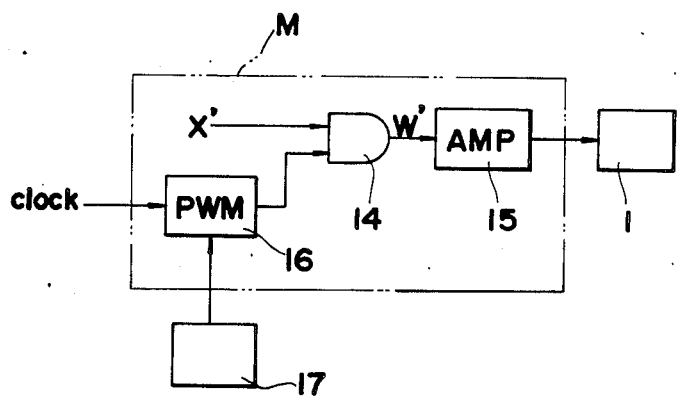
FIG. 7 is a block diagram showing the construction of another modulation system embodying the present invention.
Figure 8:
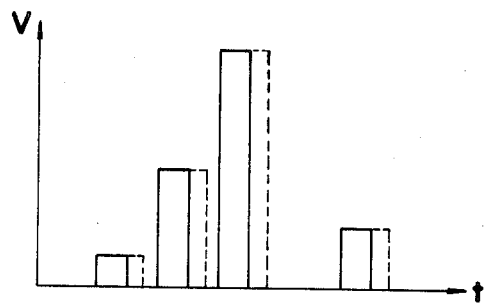
FIG. 8 is a diagram for illustrating the mode of modulation by the system of FIG. 7.

FIG. 7 shows another embodiment wherein amplitude modulation is combined with pulse width modulation. With reference to this drawing, a signal X' is a pulse signal modulated in amplitude according to an image signal and is fed to an AND circuit 14. Applied to the other input terminal of the AND circuit 14 is an output from a pulse width modulator 16 which receives an output from a switching circuit 17 to conduct pulse width modulation with reference to clock pulses, independently of the image signal. The switching circuit 17 is adjusted according to the sensitivity characteristics of the drum 4 and the output characteristics of the semiconductor laser 1 to assure tone reproducibility at a constant level at all times, despite variations in the characteristics of the drum and the laser. FIG. 8 shows this adjustment; the amplitude-modified pulses have their width varied by a definite amount.

When the image signal X is a digital signal in the first embodiment, the A/D converter 11 can be dispensed with. The bit number of the signal to be obtained by A/D conversion and the dividing ratio of the upper and lower bit signals may be suitably determined.

Figure 9:
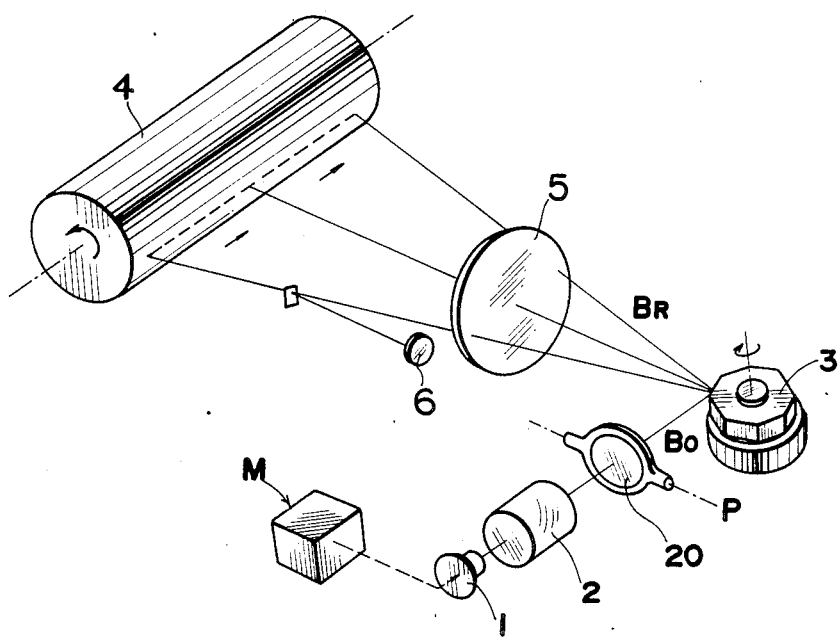
FIG. 9 is a diagram schematically showing a laser printer to which another embodiment of the invention is applied.

FIG. 9 shows a third embodiment wherein an optical element 20 for blocking light of shorter wavelengths is disposed in the path of propagation of the amplitude-modulated laser beam. With the exception of this feature, this embodiment has the same construction as the printer shown in FIG. 4.

Figure 1:
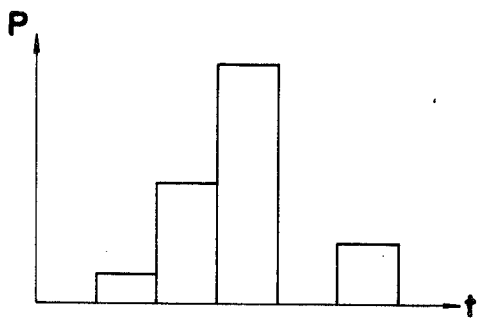
FIG. 1 is a diagram for illustrating a conventional intensity modulation system for a laser beam.
Figure 2:
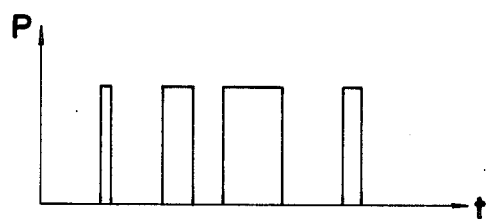
FIG. 2 is a diagram for illustrating a conventional time modulation system for a laser beam.
Figure 3:
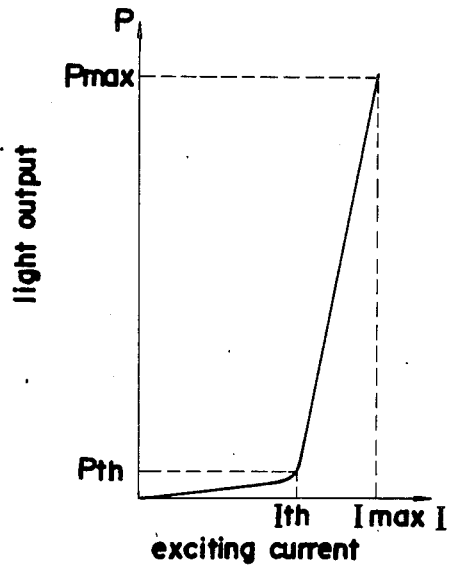
FIG. 3 is a diagram showing the light output characteristics of a semiconductor laser.
Figure 10:
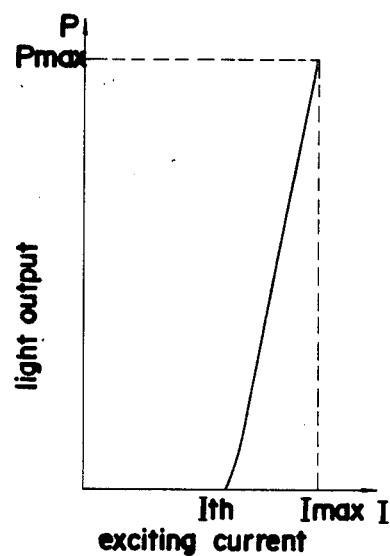
FIG. 10 is a diagram showing the light output characteristics of a semiconductor laser according to the embodiment of FIG. 9.

The optical element 20 is adapted to greatly cut off the light output below the discontinuous point Pth of the output of the semiconductor laser 1 described with reference to FIG. 3 so as to obtain a linear light output over the entire current range of from Imin to Imax as shown in FIG. 10.

Figure 11:
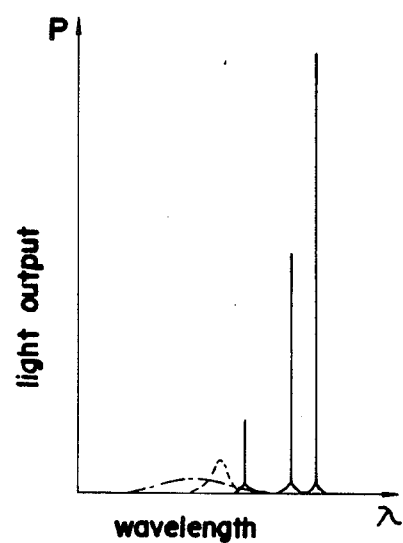
FIG. 11 is a diagram illustrating semiconductor laser light output characteristics.

The light output below Pth in FIG. 3 will be described with reference to FIG. 11. The spectrum of the laser beam from the semiconductor laser alters with the input exciting current. When the exciting current is small, the spectrum shifts toward shorter wavelengths as indicated in a dot-and-dash line and broken line in FIG. 11, while the spectrum extends over a relatively wider range. If the exciting current is greater, the light output shifts toward longer wavelengths and exhibits a sharp peak as indicated in solid lines. When the exciting current is small, the light output is at a low level at a specific wavelength but is great to some extent over the entire range of wavelengths. Thus, the light output characteristics relative to the current exhibits a gentle curve unlike those between Pth and Pmax.

The optical element 20 utilizes the fact that the exciting current lower than the threshold value produces a light output at shorter wavelengths to cut off the light of wavelengths shorter than the oscillation wavelength at the threshold current Ith, thereby reducing the light output below Pth.

The optical element 20 shown in FIG. 9 is an interference filter comprising a laminate of thin dielectric films. It is designed as the sharp cutting type, such that the transmittance τ markedly decreases at wavelengths shorter than a certain wavelength λo as indicated in a solid line in FIG. 12. The wavelength λo is set in the vicinity of the laser oscillation wavelength at the threshold current Ith.

Figure 12:
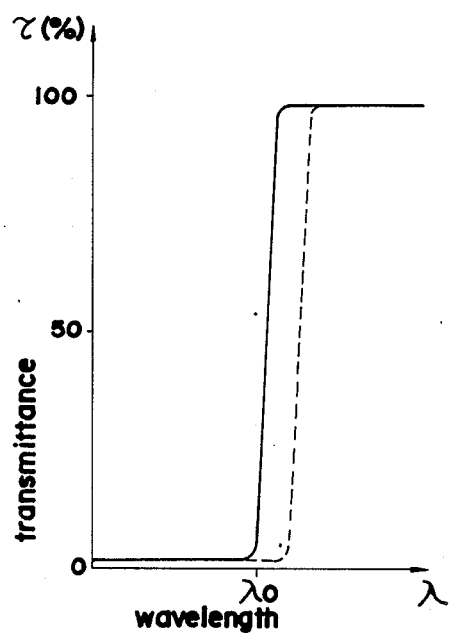
FIGS. 12 and 13 are diagrams showing the wavelength selection characteristics of optical elements for use in the embodiment of FIG. 9.

The interference filter has wavelength selectivity which shifts as indicated in a broken line in FIG. 12 depending on the angle of light incident thereon. To utilize this shiftable selectivity, the interference filter shown in FIG. 9 is supported rotatably about an axis P intersecting the optical axis and is rotatingly adjusted to the proper light blocking wavelength, whereby linear output characteristics are readily available as seen in FIG. 10.

Figure 13:
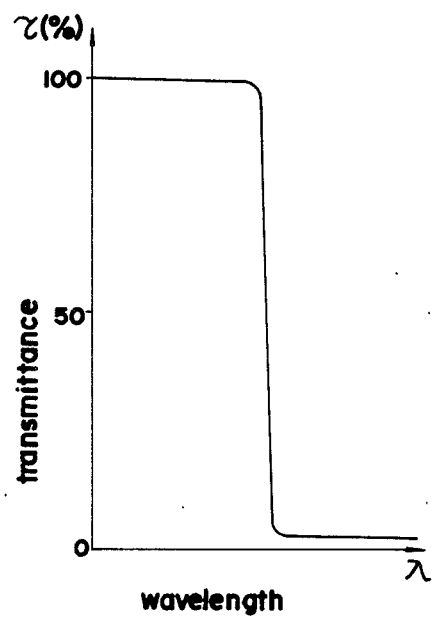

Although the interference filter is used for the embodiment of FIG. 9, an interference mirror may be used which is reverse to the interference filter in characteristics as shown in FIG. 13. Other filters are of course usable although they are slightly inferior to interference optical elements in resolving power.

It is most suitable to use the third embodiment in combination with the first or second embodiment.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A laser recording apparatus being adapted to modulate a laser beam by a multi-tone image signal and to scan the beam across a recording medium, said apparatus comprising;
    a laser light source,
    first means for producing a first pulse signal modulated in amplitude in accordance with the image signal,
    second means for producing a second pulse signal modulated in pulse width in accordance with the image signal,
    means for composing the first and second pulse signals to produce a pulse signal modulated in amplitude and width,
    means for modulating the laser beam in response to the pulse signal from the composing means, and
    means for scanning the beam across the recording medium.

2. A laser recording apparatus as claimed in claim 1, wherein the image signal is a digital binary signal according to the tone degree of the image signal, further comprising means for dividing the digital signal into upper bits and lower bits to supply the upper and lower bits to the first and second pulse signal producing means respectively.

3. A laser recording apparatus as claimed in claim 1, wherein the laser light source is a semiconductor laser.

4. A laser recording apparatus as claimed in claim 3, further comprising an optical element disposed in a light path of the scanning means for cutting off light in a range under a threshold wavelength which corresponds to a threshold exciting current.

5. A laser recording apparatus as claimed in claim 4, wherein the optical element is an interference filter or mirror.

6. A laser recording apparatus being adapted to modulate a laser beam by a multi-tone image signal and to scan the beam across a recording medium, said apparatus comprising;
    a laser light source,
    first means for producing a first pulse signal modulated in amplitude in accordance with the image signal,
    second means for producing a second pulse signal modulated in pulse width in accordance with an input signal with selected degree,
    means for composing the first and second pulse signals to produce a pulse signal for modulating the laser beam,
    means for modulating the beam in response to the pulse signal from the composing means, and
    means for scanning the beam across the recording medium.

7. A laser recording apparatus as claimed in claim 6, wherein the laser light source is a semiconductor laser.

8. A laser recording apparatus as claimed in claim 7, further comprising an optical element disposed in a light path of the scanning means for cutting off light in a range under a threshold wavelength which corresponds to a threshold exciting current.

9. A laser recording apparatus being adapted to modulate a laser beam by a multi-tone image signal and to scan the beam across a recording medium, said apparatus comprising;
    a semiconductor laser light source for producing the laser beam,
    means for modulating the beam in response to the image signal,
    means for scanning the beam across the recording medium, and
    an optical element disposed in a light path of the scanning means for cutting off light in a range under a threshold wavelength which corresponds to a threshold exciting current.

10. A laser recording apparatus as claimed in claim 8, wherein the optical element is an interference filter or mirror.

11. An improved laser recording apparatus for recording information of various degrees of image tone on a photoconductive member that can be made into a copy image by an electrophotographic process, comprising:
    a laser light source;
    control means for controlling the output of the laser light source to vary intensity and duration of the laser output;
    means for receiving an information signal indicative of the information to be recorded;
    means for producing an amplitude modulated signal in response to the information signal;
    means for producing a pulse width modulated signal in response to the information signal;
    means for applying the amplitude modulated and pulse width modulated signals to the control means to vary the intensity and duration of the laser output, and
    means for scanning the photoconductive member with the controlled laser light source to record the information.

12. The invention of claim 11 wherein the information signal comprises a plurality of bits, a first predetermined number of bits providing an amplitude modulation signal and a second predetermined number of bits providing a pulse width modulation signal.

13. The invention of claim 12 further including an optical filter for reducing the laser light of wavelengths below a laser threshold current level.

14. The invention of claim 13 wherein the optical filter is an interference filter that is rotatable to vary the incidence angle of the filter surface and the laser light.

15. The invention of claim 13 further including means for adjusting for the sensitivity characteristic of the photoconductive member.

16. In an electrophotographic apparatus having an improved laser recording apparatus for recording information of various degrees of image tone, the improvement comprising:
- a photoconductive member that can repetitively receive images for copying by an electrophotographic process;
- a laser light source for providing a laser output;
- control means for controlling the output of the laser light source to vary intensity and duration of the laser output;
- means for providing an information signal indicative of the information to be recorded, the information signal comprises a plurality of bits, a first predetermined number of bits providing an amplitude modulation signal and a second predetermined number of bits providing a pulse width modulation signal;
- means for producing an amplitude modulated signal in response to the information signal;
- means for producing a pulse width modulated signal response to the information signal;
- means for applying the amplitude modulated and pulse width modulated signals to the control means to vary the intensity and duration of the laser output;
- means for scanning the photoconductive member with the controlled laser light source to record the information; and
- means for reducing any laser light having wavelengths below a laser threshold current level.

* * * * *